United States Patent
Ming et al.

(10) Patent No.: US 11,126,174 B2
(45) Date of Patent: Sep. 21, 2021

(54) SYSTEMS AND METHODS FOR SWITCHING A DRIVING MODE OF A VEHICLE

(71) Applicant: BEIJING VOYAGER TECHNOLOGY CO., LTD., Beijing (CN)

(72) Inventors: Tingyou Ming, Hangzhou (CN); Xiaowei Chen, Beijing (CN); Mengpeng He, Beijing (CN)

(73) Assignee: BEIJING VOYAGER TECHNOLOGY CO., LTD., Beijing (CN)

( * ) Notice: Subject to any disclaimer, the term of this patent is extended or adjusted under 35 U.S.C. 154(b) by 276 days.

(21) Appl. No.: 16/236,457

(22) Filed: Dec. 29, 2018

(65) Prior Publication Data

US 2019/0138003 A1    May 9, 2019

Related U.S. Application Data

(63) Continuation of application No. PCT/CN2017/091011, filed on Jun. 30, 2017.

(51) Int. Cl.
*G05D 1/00* (2006.01)
*B60W 50/08* (2020.01)
(Continued)

(52) U.S. Cl.
CPC ......... *G05D 1/0061* (2013.01); *B60W 30/182* (2013.01); *B60W 50/082* (2013.01);
(Continued)

(58) Field of Classification Search
CPC ............... G05D 1/0061; G05D 1/021; G05D 2201/0212; G05D 2201/0207;
(Continued)

(56) References Cited

U.S. PATENT DOCUMENTS 8,874,301 B1   10/2014 Rao et al.
9,511,779 B2   12/2016 Cullinane et al.
(Continued)

FOREIGN PATENT DOCUMENTS

CN    105523039 A    4/2016
CN    106043309 A    10/2016
(Continued)

OTHER PUBLICATIONS

Notice of Final Rejection in Japanese Application No. 2015-564230 dated Dec. 1, 2020, 6 pages.
(Continued)

*Primary Examiner* — Jess Whittington
*Assistant Examiner* — Gabriel J Lambert
(74) *Attorney, Agent, or Firm* — Metis IP LLC

(57) ABSTRACT

The present disclosure relates to electronic system and methods for switching a driving mode of a vehicle. The electronic system may include at least one sensor configured to connect to a driving system of a vehicle; at least one gateway module connected to the at least one sensor through a controller area network; and processing circuits connected to the at least one gateway module. During operation, the processing circuits may receive at least one trigger signal from the at least one sensor; determine that the at least one trigger signal meets a predetermined condition; and send at least one switching signal to the gateway module to switch the vehicle from a current driving mode to a target driving mode.

18 Claims, 8 Drawing Sheets

(51) Int. Cl.
*B60W 50/14* (2020.01)
*B60W 50/10* (2012.01)
*B60W 30/182* (2020.01)
*G05D 1/02* (2020.01)
*B60W 50/00* (2006.01)
*B60W 50/02* (2012.01)

(52) U.S. Cl.
CPC ............ *B60W 50/10* (2013.01); *B60W 50/14* (2013.01); *G05D 1/021* (2013.01); *B60W 2050/0045* (2013.01); *B60W 2050/0215* (2013.01); *B60W 2420/42* (2013.01); *B60W 2420/52* (2013.01); *B60W 2510/244* (2013.01); *B60W 2530/209* (2020.02); *B60W 2540/10* (2013.01); *B60W 2540/12* (2013.01); *B60W 2540/18* (2013.01); *B60W 2540/21* (2020.02); *B60W 2540/215* (2020.02); *B60W 2555/20* (2020.02); *B60W 2556/50* (2020.02); *G05D 2201/0213* (2013.01)

(58) Field of Classification Search
CPC .... B60W 50/082; B60W 50/14; B60W 50/10; B60W 30/182; B60W 2540/215; B60W 2555/20; B60W 2556/50; B60W 2540/12; B60W 2540/10; B60W 2540/18
See application file for complete search history.

(56) References Cited

U.S. PATENT DOCUMENTS

| | | | | |
|---|---|---|---|---|
| 2014/0303827 | A1* | 10/2014 | Dolgov | B60W 30/00 701/23 |
| 2015/0274178 | A1* | 10/2015 | Tsuyunashi | B60W 30/09 701/36 |
| 2016/0039428 | A1 | 2/2016 | Odate | |
| 2016/0167668 | A1 | 6/2016 | Prohorov et al. | |
| 2016/0280236 | A1 | 9/2016 | Otsuka | |
| 2016/0362116 | A1* | 12/2016 | Otsuka | B60W 50/0098 |
| 2017/0088145 | A1* | 3/2017 | Gordon | B60W 50/12 |
| 2017/0110022 | A1 | 4/2017 | Gulash | |
| 2017/0151950 | A1 | 6/2017 | Lien | |
| 2017/0305425 | A1 | 10/2017 | Xing | |
| 2018/0229743 | A1 | 8/2018 | Aoi | |
| 2018/0284759 | A1* | 10/2018 | Michalakis | B60W 10/04 |
| 2018/0304828 | A1 | 10/2018 | Kitani et al. | |
| 2018/0329414 | A1 | 11/2018 | Igarashi et al. | |
| 2018/0356818 | A1 | 12/2018 | Arai et al. | |

FOREIGN PATENT DOCUMENTS

| | | |
|---|---|---|
| CN | 106094810 A | 11/2016 |
| CN | 106094840 A | 11/2016 |
| CN | 106809216 A | 6/2017 |
| EP | 3045369 A1 | 7/2016 |
| EP | 3178715 A1 | 6/2017 |
| JP | H09160643 A | 6/1997 |
| JP | H1076965 A | 3/1998 |
| JP | H10309960 A | 11/1998 |
| JP | H1191397 A | 4/1999 |
| JP | 2005145400 A | 6/2005 |
| JP | 2016097873 A | 5/2016 |
| JP | 2017010482 A | 1/2017 |
| JP | 2017054170 A | 3/2017 |

OTHER PUBLICATIONS

The Search Report and Written Opinion in Singapore Application No. 11201810979S dated Oct. 1, 2019, 11 pages.
The Extended European Search Report in European Application No. 17911394.9 dated Jun. 7, 2019, 8 pages.
Office Action in Canadian Application No. 3026666 dated May 19, 2020, 5 pages.
Notice of Rejection in Japanese Application No. 2018-564230 dated May 26, 2020, 12 pages.
International Search Report in PCT/CN2017/091011 dated Mar. 27, 2018, 5 pages.
Written Opinion in PCT/CN2017/091011 dated Mar. 27, 2018, 4 pages.
Office Action in Canadian Application No. 3026666 dated Dec. 5, 2019, 7 pages.
The Notice of Reasons for Rejection in Japanese Application No. 2018564230 dated Jan. 8, 2020, 8 pages.
Examination Report in Singaporean Application No. 11201810979S dated Jul. 7, 2020, 5 pages.
Reconsideration Report by Examiner before Appeal in Japanese Application No. 2018564230 dated Apr. 21, 2021, 5 pages.

* cited by examiner

SYSTEMS AND METHODS FOR SWITCHING A DRIVING MODE OF A VEHICLE

CROSS-REFERENCE TO RELATED APPLICATIONS

This application is a continuation of International Application No. PCT/CN2017/091011, filed on Jun. 30, 2017, the content of which is incorporated herein in its entirety by reference.

TECHNICAL FIELD

The present disclosure relates generally to systems and methods for switching a driving mode of a vehicle, and in particular, to systems and methods for determining at least one switching signal that switches the vehicle between manual drive and autonomous drive.

BACKGROUND

During autonomous drive, an autonomous vehicle may essentially drives itself without input from a driver. Under manual drive, the driver of the autonomous vehicle may take a high degree of control over the movement of the autonomous vehicle. It may be necessary to provide systems and methods for determining a switching signal that switches the autonomous vehicle between the manual drive and the autonomous drive according to different situations.

SUMMARY

According to an aspect of the present disclosure, an electronic system is provided. The electronic system may include at least one sensor configured to connect to a driving system of a vehicle; at least one gateway module connected to the at least one sensor through a controller area network; and processing circuits connected to the at least one gateway module. During operation, the processing circuits may receive at least one trigger signal from the at least one sensor; determine that the at least one trigger signal meets a predetermined condition; and send at least one switching signal to the gateway module to switch the vehicle from a current driving mode to a target driving mode.

In some embodiments, the current driving mode may include an autonomous driving mode and the target driving mode may include a manual driving mode; or the current driving mode may include the manual driving mode and the target driving mode may include the autonomous driving mode. Under the autonomous driving mode the vehicle may substantially independently determine and execute a navigation strategy without a driver's input.

In some embodiments, the at least one trigger signal may be associated with a rotation force of a steering wheel of the vehicle, and the predetermined condition may include that the rotation force is larger than a first predetermined threshold.

In some embodiments, the at least one sensor may include a touch sensor on the steering wheel of the vehicle to sense a touch on the steering wheel, and the at least one trigger signal may include at least one signal from the touch sensor.

In some embodiments, the at least one trigger signal may be associated with a sensor signal caused by a control action of at least one of a steering wheel of the vehicle, a throttle or a brake pedal of the vehicle; and the predetermined condition may include that the control action matches a predetermined machine learned reference behavior.

In some embodiments, the processing circuits may further receive status signals from the at least one sensor; determine a status of the vehicle based on the status signals; transmit a notification to a driver of the vehicle based on the at least one trigger signal and the status of the vehicle; receive a switch confirmation from the driver in response to the notification, confirming the switching of the vehicle from the current driving mode to the target driving mode; and generate the switching signal.

In some embodiments, the switch confirmation may include at least one of a click on a user interface of the vehicle, a press on a button of the vehicle, or a voice command.

In some embodiments, the status of the vehicle may include at least one of remained power, a remained volume of gasoline, a current location of the vehicle, a current speed of the vehicle, a current road condition, or a current weather condition; and the processing circuits may generate the at least one switching signal only when the status of the vehicle meets a predetermined status.

In some embodiments, the processing circuits may further: detect occurrence of an emergency to the vehicle; transmit an emergency notification reporting the emergency to a driver of the vehicle; receive an emergency switch confirmation that switches the vehicle from an autonomous driving mode to a manual driving mode in response to the emergency notification from the driver; and determine emergency switch signals that switch the vehicle from the autonomous driving mode to the manual driving mode based on the emergency switch confirmation.

According to another aspect of the present disclosure, a method is provided. The method may be for implementing on an electronic system having at least one sensor configured to connect to a driving system of a vehicle, at least one gateway module connected to the at least one sensor through a controller area network, and processing circuits connected to the at least one gateway module. The method may include: receiving at least one trigger signal from at least one sensor; determining that the at least one trigger signal meets a predetermined condition; and sending at least one switching signal to a gateway module to switch the vehicle from a current driving mode to a target driving mode.

In some embodiments, the current driving mode may include an autonomous driving mode and the target driving mode may include a manual driving mode; or the current driving mode may include the manual driving mode and the target driving mode may include the autonomous driving mode, under the autonomous driving mode the vehicle may substantially independently determine and execute a navigation strategy without a driver's input.

In some embodiments, the at least one trigger signal may be associated with a rotation force of a steering wheel of the vehicle, and the predetermined condition may include that the rotation force is larger than a first predetermined threshold.

In some embodiments, the at least one sensor may include a touch sensor on the steering wheel of the vehicle to sense a touch on the steering wheel, and the at least one trigger signal may include at least one signal from the touch sensor.

In some embodiments, the at least one trigger signal may be associated with a sensor signal caused by a control action of at least one of a steering wheel of the vehicle, a throttle or a brake pedal of the vehicle; and the predetermined condition may include that the control action matches a predetermined machine learned reference behavior.

In some embodiments, the method may further include: receiving status signals from the at least one sensor; determining a status of the vehicle based on the status signals; transmitting a notification to a driver of the vehicle based on the at least one trigger signal and the status of the vehicle; receiving a switch confirmation from the driver in response to the notification, confirming the switching of the vehicle from the current driving mode to the target driving mode; and generating the switching signal.

In some embodiments, the switch confirmation may include at least one of a click on a user interface of the vehicle, a press on a button of the vehicle, or a voice command.

In some embodiments, the status of the vehicle may include at least one of remained power, a remained volume of gasoline, a current location of the vehicle, a current speed of the vehicle, a current road condition, or a current weather condition; and the processing circuits generate the at least one switching signal only when the status of the vehicle meets a predetermined status.

In some embodiments, the method may further include: detecting occurrence of an emergency to the vehicle; transmitting an emergency notification reporting the emergency to a driver of the vehicle; receiving an emergency switch confirmation that switches the vehicle from an autonomous driving mode to a manual driving mode in response to the emergency notification from the driver; and determining emergency switch signals that switch the vehicle from the autonomous driving mode to the manual driving mode based on the emergency switch confirmation.

According to another aspect of the present disclosure, a non-transitory computer readable medium is provided. The computer readable medium may include instructions configured to cause an electronic system to: receive at least one trigger signal from at least one sensor; determine that the at least one trigger signal meets a predetermined condition; and send at least one switching signal to a gateway module to switch the vehicle from a current driving mode to a target driving mode.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
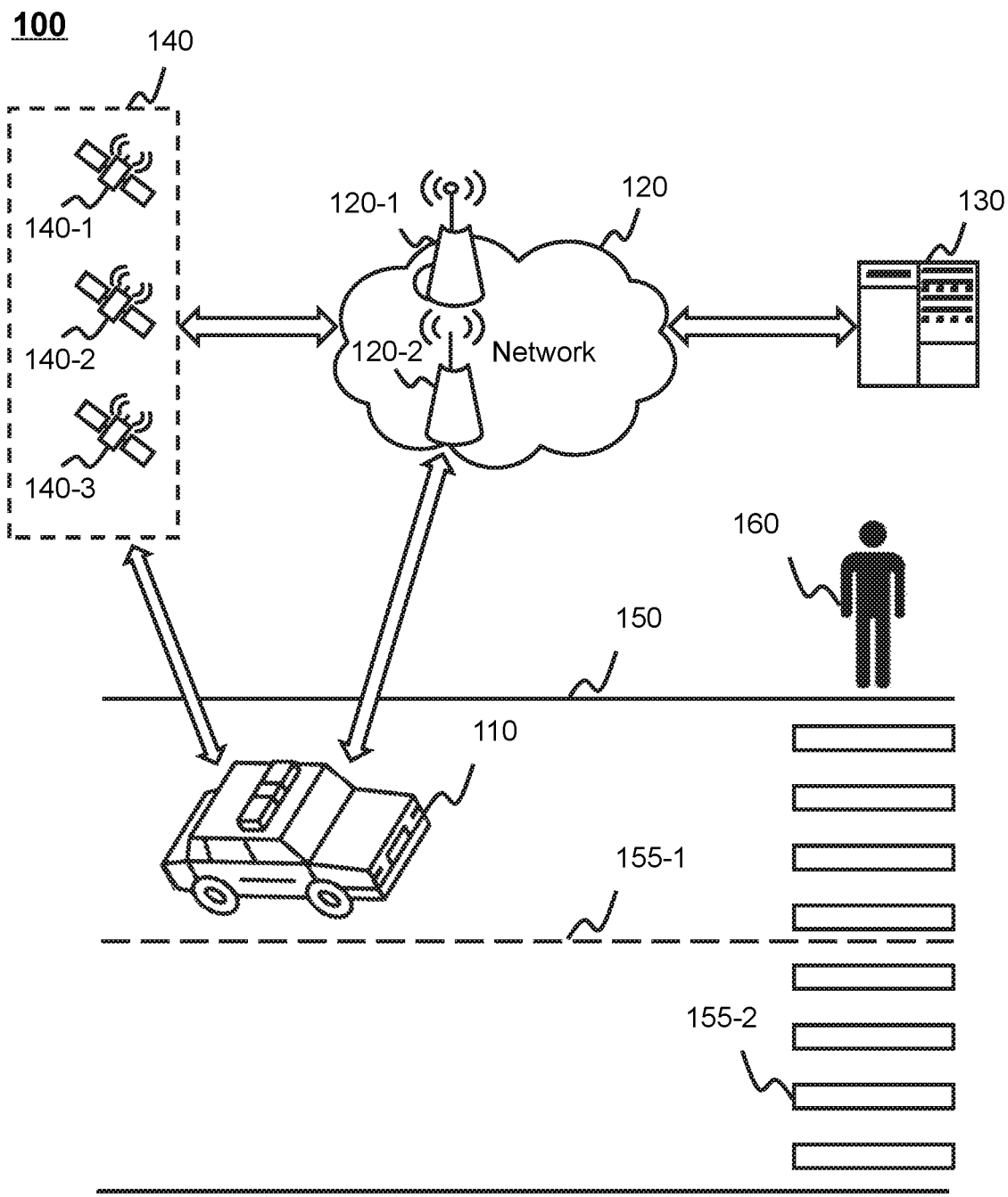
FIG. 1 is a schematic diagram illustrating an exemplary autonomous driving system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of the present disclosure. It is to be expressly understood, however, that the drawings are for purposes of illustration and description only and are not intended to limit the scope of the present disclosure. It is understood that the drawings are not to scale.

The flowcharts used in the present disclosure illustrate operations that systems implement according to some embodiments in the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

An aspect of the present disclosure relates to systems and methods for switching a vehicle between an autonomous driving mode and a manual driving mode. According to the present disclosure, the systems and methods may analyze whether a driver's behavior is sufficient to switch the driving mode of the vehicle. Under the autonomous driving mode, the vehicle may lock the steering wheel system, the throttle, and/or the braking system to prevent interference from the user. However, the vehicle may switch from the autonomous driving mode to manual driving mode when a rotation force of the steering wheel is larger than a first threshold, a strength of stepping on a throttle is larger than a second threshold, etc. The first threshold and the second threshold may be predetermined or determined by machine learned reference behaviors. The systems and methods may also analyze the environment conditions and emergencies around the vehicle to determine whether to switch the driving mode of the vehicle.

It should be noted that the switching of a driving mode automatically is a newly emerged service rooted in post-Internet era. It provides the technical solutions to the drivers that could raise in post-Internet era. In pre-Internet era, it is impossible to analyze the driver's behavior, the environment conditions, or the emergencies to determine whether to switch the driving mode automatically without a driver's behavior. Therefore, the present solution is deeply rooted in and aimed to solve a problem only occurred in post-Internet era.

FIG. 1 is a schematic diagram illustrating an exemplary autonomous driving system 100 according to some embodiments of the present disclosure. As shown in FIG. 1, the autonomous driving system 100 may include at least one vehicle 110, a network 120, a server 130, and a positioning system 140. In some embodiments, the vehicle 110 may navigate on a road 150. The road 150 may include a dash line (i.e., a lane line) 155-1 to define a lane, a crossing 155-2, etc. A pedestrian 160 may walk across the road 150 on the crossing 155-2.

The vehicle 110 may navigate from one place to another. In some embodiments, a driver may be behind a steering wheel of the vehicle 110. The vehicle 110 may operate in a manual driving mode, an autonomous driving mode, or a semi-autonomous driving mode.

Under the manual driving mode, the driver may take a high degree control of the vehicle. For example, the driver may control the steering wheel of the vehicle 110, a throttle of the vehicle 110, a brake pedal of the vehicle 110, etc.

Under the autonomous driving mode, the vehicle 110 may detect and/or receive environmental information of the vehicle, process the environmental information to independently determine and/or substantially independently determine a navigation strategy, and then execute the navigation strategy without the driver's input. For example, the vehicle 110 may receive mapping and route information from the positioning system 140, detect traffic condition and weather condition around itself, and then independently conduct route planning strategy (local driving speed and maneuvering strategy, etc.) in real-time, and then execute the route planning strategy without the driver's input. The driver's input may include the driver's control of the steering wheel, the throttle, the brake pedal, etc. The vehicle 110 may use a plurality of techniques to detect surrounding information. Exemplary technique may include a radar technique, a laser light technique, a positioning technique (e.g., GPS), an odometry technique, a video technique, an ultrasonic technique, or the like, or any combination thereof. The surrounding information may include other vehicles, traffic signals and signs, directional information, locations, speeds, acceleration, fuel information, roads, intersections, lane information (e.g., the lane line 155-1, the crossing 155-2, etc.), lane boundaries, speed limits, pedestrians (e.g., the pedestrian 160), weather information, or the like, or any combination thereof. The vehicle 110 may control the vehicle 110 based on the surrounding information. For example, a video camera of the vehicle 110 may detect a red traffic light ahead, the vehicle 110 may slow down and stop before the traffic light.

Under the semi-autonomous driving mode, the vehicle 110 may navigate with the help of the driver. For example, the driver may only control the steering wheel of the vehicle 110. The vehicle 110 may control other components (e.g., the throttle, the brake pedal, etc.) automatically without the driver's input.

The vehicle 110 may communicate with the network 120, the server 130, the positioning system 140, etc. For example, the vehicle 110 may communicate with other vehicles via the network 120. As another example, the vehicle 110 may send information (e.g., position information, time information, etc.) of the vehicle 110 to the server 130 at a regular interval. The server 110 may monitor the vehicle 110 based on the information. As still another example, the vehicle 110 may include a signal transmitter and a signal receiver configured to communicate with the positioning system 140 for locating a position of the vehicle 110.

The vehicle 110 may be any type of vehicle including, for example, a car, a truck, a motorcycle, a bus, a boat, an airplane, a helicopter, a lawnmower, a recreational vehicle, an amusement park vehicle, a farm equipment, a construction equipment, a tram, a golf cart, a train, etc.

The network 120 may facilitate exchange of information and/or data. In some embodiments, one or more components in the autonomous driving system 100 (e.g., the vehicle 110, the server 130, etc.) may send information and/or data to other component(s) in the autonomous driving system 100 via the network 120. For example, the server 130 may receive a location information of the vehicle 110 from the vehicle 110 via the network 120. In some embodiments, the network 120 may be any type of wired or wireless network, or combination thereof. Merely by way of example, the network 120 may include a cable network, a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth™ network, a ZigBee™ network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the on-demand service system 100 may be connected to the network 120 to exchange data and/or information.

The server 130 may be a computer server. In some embodiments, the server 130 may be a single server, or a server group. The server group may be centralized, or distributed (e.g., the server 130 may be a distributed system). In some embodiments, the server 130 may be local or remote. For example, the server 130 may access information and/or data stored in the vehicle 110 via the network 120. As another example, the server 130 may be directly connected to the vehicle 110 to access stored information and/or data. In some embodiments, the server 130 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 130 may be implemented on a computing device 200 having one or more components illustrated in FIG. 2 in the present disclosure.

The positioning system 140 may determine information associated with an object, for example, the vehicle 110, the server 130, etc. For example, the positioning system 140 may determine a current time and a current location of the vehicle 110. In some embodiments, the positioning system 140 may be a global positioning system (GPS), a global navigation satellite system (GLONASS), a compass navigation system (COMPASS), a BeiDou navigation satellite system, a Galileo positioning system, a quasi-zenith satellite system (QZSS), etc. The information may include a location, an elevation, a velocity, or an acceleration of the object, and/or a current time. The positioning system 140 may include one or more satellites, for example, a satellite 140-1, a satellite 140-2, and a satellite 140-3. The satellite 140-1 through 140-3 may determine the information mentioned above independently or jointly. The positioning system 140 may send the information mentioned above to the vehicle 110, or the server 130 via the network 120.

Figure 2:
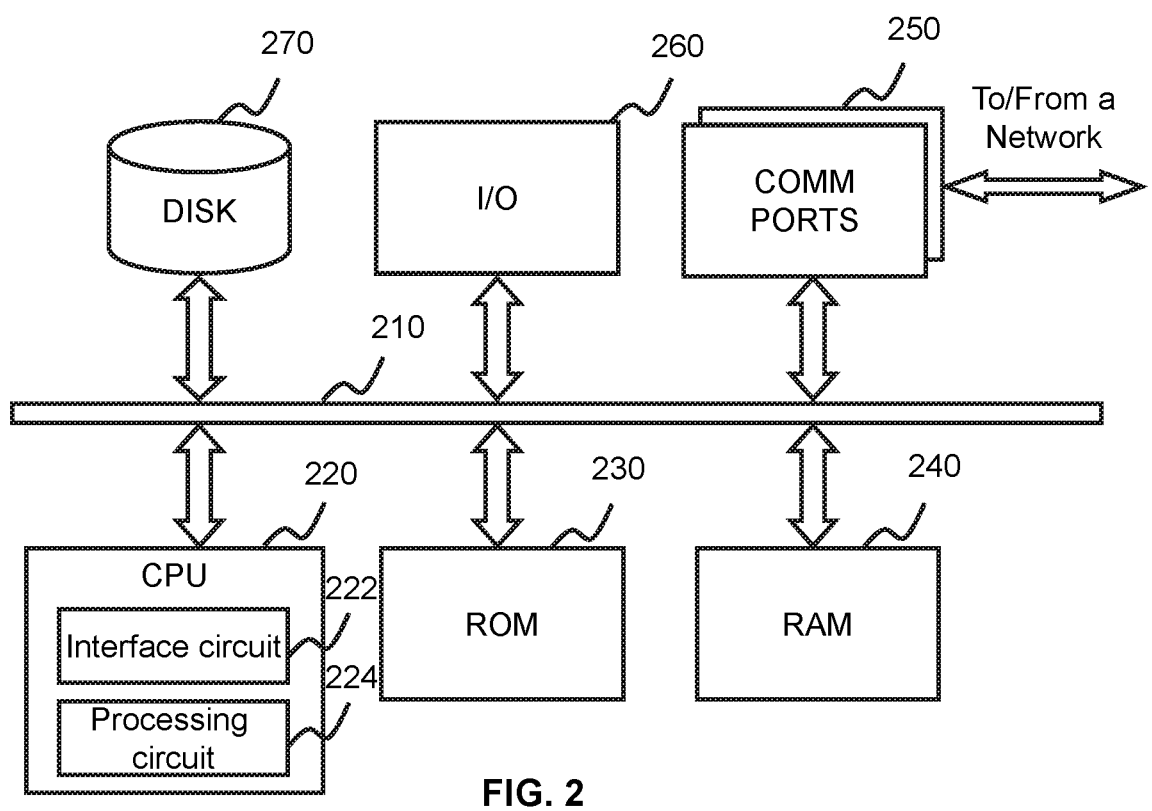
FIG. 2 is a schematic diagram illustrating exemplary hardware and/or software components of a computing device according to some embodiments of the present disclosure.

FIG. 2 is a schematic diagram illustrating exemplary hardware and/or software components of a computing device 200 according to some embodiments of the present disclosure. The computing device 200 may be a special computer designed to be mounted on and control performances of a vehicle. For example, the computing device 200 may be a mono-plate processor.

The computing device 200 may be used to implement an autonomous driving system for the present disclosure. The computing device 200 may be used to implement any component of the autonomous driving system as described herein. For example, the computing module 420 of the vehicle 110 may be implemented on the computing device 200, via its hardware, software program, firmware, or a combination thereof. Although only one such computer is shown for convenience, the computer functions related to the service as described herein may be implemented in a distributed manner on a number of similar platforms to distribute the processing load.

The computing device 200, for example, may include COM ports 250 connected to and from a network (e.g., the network 120) connected thereto to facilitate data communications. The computing device 200 may also include a central processing unit (CPU) 220, in the form of one or more processors, for executing program instructions. The exemplary computer platform may include an internal communication bus 210, program storage and data storage of different forms, for example, a disk 270, and a read only memory (ROM) 230, or a random access memory (RAM) 240, for various data files to be processed and/or transmitted by the computer. The exemplary computer platform may also include program instructions stored in the ROM 230, the RAM 240, and/or other type of non-transitory storage medium to be executed by the CPU 220. The methods and/or processes of the present disclosure may be implemented as the program instructions. The computing device 200 may also include an I/O component 260, supporting input/output between the computer, the user, and other components therein. The computing device 200 may also receive programming and data via network communications.

For example, the CPU 220 may include one or more interface circuits 222 and processing circuits 224 therein. The interface circuits 222 may be configured to receive electronic signals from other components of the computing device 200 (e.g., the RAM 230, the ROM 240, the disk 270, etc.) via the internal communication bus 210, wherein the electronic signals encode structured data and/or instructions for the processing circuits 224 to process. The processing circuits 224 may process the structured data and/or instructions by performing an operation, such as an arithmetic calculation, a logic calculation, a control operation, etc. The interface circuits 222 may receive a result of the operation encoded as electrical signals. The interface circuits 222 may send out the electronic signals from the processing circuits 224 via the internal communication bus 210.

Merely for illustration, only one CPU and/or processor is described in the computing device 200. However, it should be noted that the computing device 200 in the present disclosure may also include multiple CPUs and/or processors, thus operations and/or method steps that are performed by one CPU and/or processor as described in the present disclosure may also be jointly or separately performed by the multiple CPUs and/or processors. For example, the CPU and/or processor of the computing device 200 may execute both step A and step B. As in another example, step A and step B may also be performed by two different CPUs and/or processors jointly or separately in the computing device 200 (e.g., the first processor executes step A and the second processor executes step B, or the first and second processors jointly execute steps A and B).

Figure 3:
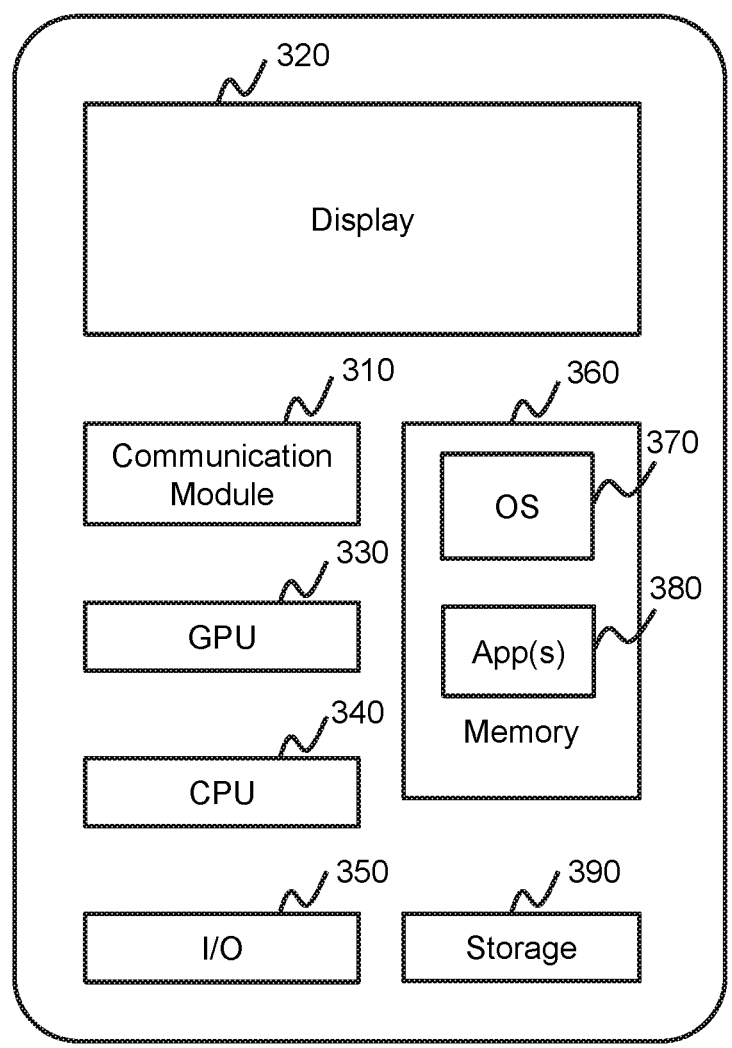
FIG. 3 is a schematic diagram illustrating exemplary hardware and/or software components of a mobile device according to some embodiments of the present disclosure.

FIG. 3 is a schematic diagram illustrating exemplary hardware and/or software components of a mobile device 300 according to some embodiments of the present disclosure. As illustrated in FIG. 3, the mobile device 300 may include a communication module 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™, etc.) and one or more applications 380 may be loaded into the memory 360 from the storage 390 in order to be executed by the CPU 340. The applications 380 may include a browser or any other suitable apps for transmitting, receiving and presenting information relating to the status of the vehicle 110 (e.g., the location of the vehicle 110) from the server 130. User interactions with the information stream may be achieved via the I/O 350 and provided to the server 130 and/or other components of the autonomous driving system 100 via the network 120.

Figure 4:
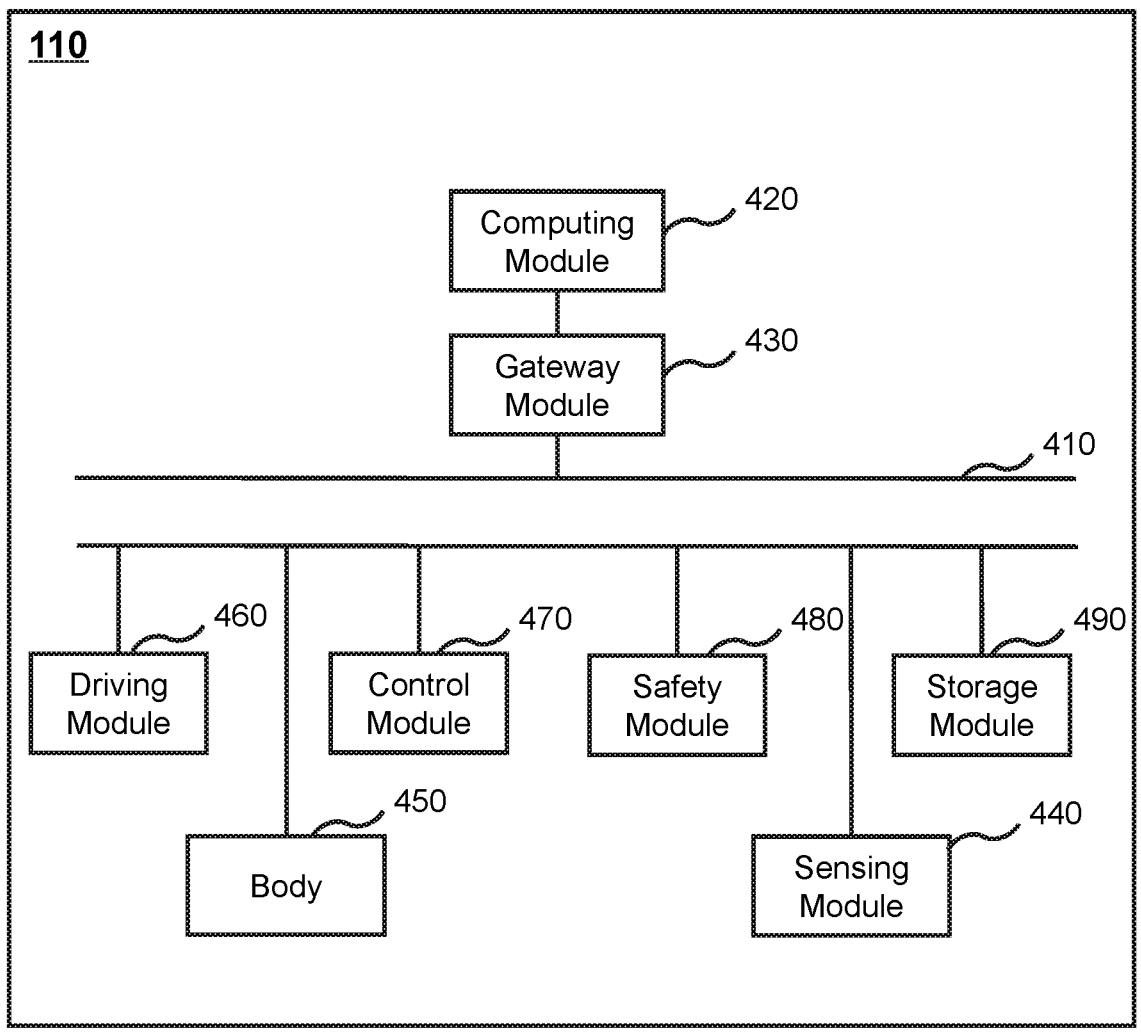
FIG. 4 is a block diagram illustrating an exemplary vehicle according to some embodiments of the present disclosure.

FIG. 4 is a block diagram illustrating an exemplary vehicle 110 according to some embodiments of the present disclosure. As shown in FIG. 4, the vehicle 110 may include a vehicle network 410, a computing module 420, a gateway module 430, a sensing module 440, a body 450, a driving module 460, a control module 470, a safety module 480, and a storage module 490.

The vehicle network 410 may be configured to facilitate exchange of information and/or data. In some embodiments, one or more components in the vehicle 110 (e.g., the computing module 420, the gateway module 430, the sensing module 440, the storage module 490, etc.) may send information and/or data to other component(s) in the vehicle 110 via the vehicle network 410. For example, the computing module 420 may access and/or obtain information and/or data from the storage module 490 via the vehicle network 410. For example, the computing module 420 transmit a switching signal to the driving module 460 and/or the control module 470 via the vehicle network 410 to switch the vehicle 110 from a current driving mode to a target driving mode. In some embodiments, the vehicle network 410 may include one or more controller area networks (CANs), one or more local interconnect networks (LINs), an Ethernet network, a FlexRay™ network, a media oriented systems transport (MOST) network, etc.

The computing module 420 may be configured to process information and/or data. The information and/or data may be received from other components of the vehicle 110 (e.g., the gateway module 430, the sensing module 440, the storage module 490, etc.). For example, the computing module 420 may receive status signals from the sensing module 440, and determine a status of the vehicle 110 based on the status signals. As another example, the computing module 420 may determine a switching signal to switch the vehicle 110 from a current driving mode to a target driving mode. In some embodiments, the computing module 420 may be implemented on the computing device 200 and/or the mobile device 300 and configured to perform functions of the computing module 420 in this disclosure.

In some embodiments, the computing module 420 may be a special computer designed to be mounted on and control performances of a vehicle. For example, the computing device 200 may be a mono-plate processor. In some embodiments, the computing module 420 may also include other device such as a mobile device, a tablet computer, a laptop computer, a built-in device in the vehicle 110, or the like, or any combination thereof. In some embodiments, the mobile device may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, a smart glass, a smart helmet, a smart watch, smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass™, an Oculus Rift™, a Hololens™, a Gear VR™, etc. In some embodiments, the built-in device may include an onboard computer, an onboard television, etc.

In some embodiments, the computing module 420 may include one or more processing units (e.g., single-core processing engine(s) or multi-core processing engine(s)). Merely by way of example, the computing module 420 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The gateway module 430 may be configured to enable communication between the computing module 420 and other vehicle components (e.g., the sensing module 440, the driving module 460, the control module 470, the safety module 480, and/or the storage module 490) over the vehicle network 410. For example, the computing module 420 may transmit a switching signal to the gateway module 430 to switch the vehicle 110 from a current driving mode to a target driving mode. The gateway module 430 may then transmit the switching signal to the driving module 460 and/or the control module 470 via the vehicle network 410. As another example, the gateway module 430 may access and/or obtain data from one or more components of the vehicle 110 (e.g., the sensing module 440, the driving module 460, the control module 470, the storage module 490, etc.) via the vehicle network 410. The gateway module 430 may then transmit the data to the computing module 420.

The sensing module 440 may be configured to detect information related to the vehicle 110. The sensing module 440 may detect the information and generate a sensor signal. The sensing module 440 may transmit the sensor signal to the computing module 420 via the vehicle network 410 and/or the gateway module 430. In some embodiments, the sensing module 440 may include at least one touch sensor, at least one microphone, at least one speaker, at least one global positioning system (GPS), at least one inertial measurement unit (IMU), at least one camera, at least one light detection and ranging (LIDAR), at least one radio detection and ranging (RADAR), at least one ultrasonic sensor, at least one environmental sensor or sensing system, or the like, or any combination thereof. The touch sensor may be configured to sense a driver's touch on the vehicle. For example, the touch sensor may include at least one touch sensor on the steering wheel of the vehicle, at least one press sensor on the throttle of the vehicle, at least one press sensor on the brake pedal of the vehicle, at least one finger touch sensor on at least one touchscreen of the vehicle, etc. The microphone may be configured to receive audio (e.g., a voice command or other audio input) from the driver of the vehicle. The speaker may be configured to output audio to the driver of the vehicle. The GPS may be configured to determine a geographic location of the vehicle. For example, the GPS may communicate with the positioning system 140 and/or the network 120 to determine the geographic location of the vehicle. The IMU may be configured to sense position and orientation changes of the vehicle based on an inertial acceleration of the vehicle. Exemplary IMU may include one or more accelerometers, gyroscopes, etc. The camera may be configured to capture images of the environment in which the vehicle is located. For example, the camera may detect visible light, infrared light, ultraviolet light, or light of any other wavelength around the vehicle. As another example, the camera may detect road condition around the vehicle, such as traffic lights, road signs, the positions of other vehicles, pedestrians and/or obstacles on a road, etc. The camera may be any type of camera including, for example, a still camera, a video camera, etc. The LIDAR, the RADAR and the ultrasonic sensor may be configured to detect an object by electric wave. The object may include other vehicles, lane markings, curbs, etc. The LIDAR, the RADAR and the ultrasonic sensor may determine characteristics of the object (e.g., a range from the object to the vehicle, an altitude of the object, a direction of the object, a speed of the object, etc.) using different techniques. For example, the RADAR may use radio waves to determine a distance between the object and the vehicle. As another example, the LIDAR may use light beams to determine a distance between the object and the vehicle. As still another, the ultrasonic sensor may use sound propagation to determine a distance between the object and the vehicle. The environmental sensor may include one or more sensors configured to sense environment information. The environment information may include a status of the vehicle (e.g., remained power, a remained volume of gasoline, a current location of the vehicle, a current speed of the vehicle, a current road condition, or a current weather condition, etc.), a status of a driver of the vehicle (e.g., a heart rate of the driver, alcohol concentration of the driver, etc.), etc.

The body 450 may include main body of the vehicle 110. In some embodiments, the body 450 may include a body shell, windows, seats, doors, an air conditioning equipment, etc.

The driving module 460 may be configured to provide power for the vehicle 110. The driving module 460 may receive control signals from the computing module 420 for controlling the power output of the vehicle 110. In some embodiments, the driving module 460 may include one or more engines, energy sources, transmissions, wheels, etc. In some embodiments, the engines may include at least one internal combustion engine, at least one electric motor, at least one steam engine, at least one Stirling engine, or the like, or any combination thereof. In some embodiments, the engines may include at least one gasoline engine, at least one electric motor, etc. The energy sources may be a source of energy that powers the engines. The engines may convert the energy source into mechanical energy. Exemplary types of the energy sources may include gasoline, diesel, compressed gas-based fuels, propane, ethanol, solar panels, batteries, other sources of electrical power, etc. The transmissions may be configured to transmit mechanical power from the engines to the wheels. In some embodiments, the transmissions may include at least one gearbox, at least one clutch, at least one differential, at least one drive shaft, etc. The wheels may be implemented in various formats including, for example, a unicycle, a motorcycle, a tricycle, a four-wheel format, etc.

The control module 470 may be configured to control operations of the vehicle 110. The control module 470 may include a steering unit (e.g., a steering wheel), a brake unit (e.g., a brake pedal), a throttle, etc. The steering unit may be configured to adjust the heading and/or direction of the vehicle 110. The brake unit may be configured to decelerate the vehicle 110. The throttle may be configured to control the speed and/or the acceleration of the vehicle 110. The steering unit, the brake unit, and/or the throttle may include any combination of mechanisms to implement the functions thereof.

The safety module 480 may be configured to ensure safety of the vehicle 110. The safety module 480 may include a safety airbag, a safety belt, etc. For example, when a collision occurs to the vehicle 110, the safety airbag may inflate extremely rapidly then quickly deflate to ensure the safety of a driver of the vehicle 110. As another example, when the vehicle 110 suddenly stops or crashes, the driver of the vehicle 110 may continue at the same speed the vehicle 110 was going before it stopped. The safety belt may provide an opposing force to the driver to prevent the driver from falling out.

In some embodiments, the vehicle 110 may further include one or more electrical control units (ECUs). The ECU may be configured to navigate the vehicle 100 automatically. Exemplary types of the ECU may include an engine management system (EMS), an electric power steering (EPS) system, an electric stability control (ESC) system, a steering column module (SCM), a door control unit (DCU), a speed control unit (SCU), a brake control unit, an electric control wiper (ECW), an electronic steering column lock (ESCL), a front area module (FAM), a driver door module (DDM), a smart key (SMK), a power seat module (PSM), etc.

The storage module 490 may be configured to store information and/or data. The information and/or data may be provided by the computing module 420, the gateway module 430, the sensing module 440, the driving module 460, or any component of the vehicle 110 and/or the autonomous driving system 100. In some embodiments, the storage module 490 may store trigger signals from the sensing module 440, switching signals from the computing module 420, and/or encoded electrical signals. In some embodiments, the storage module 490 may store programs and/or instructions that can be executed by the processors of the computing module 420 to receive a trigger signal from at least one sensor for switching a vehicle from a current driving mode to a target driving mode, determine that the trigger signal meets a predetermined condition, and send a switching signal to a gateway module to switch the vehicle from the current driving mode to the target driving mode. In some embodiment, the storage module 490 include a hard disk drive, a solid-state drive, a removable storage drive (e.g., a flash memory disk drive, an optical disk drive, etc.), a digital video recorder, or the like, or a combination thereof.

Figure 5:
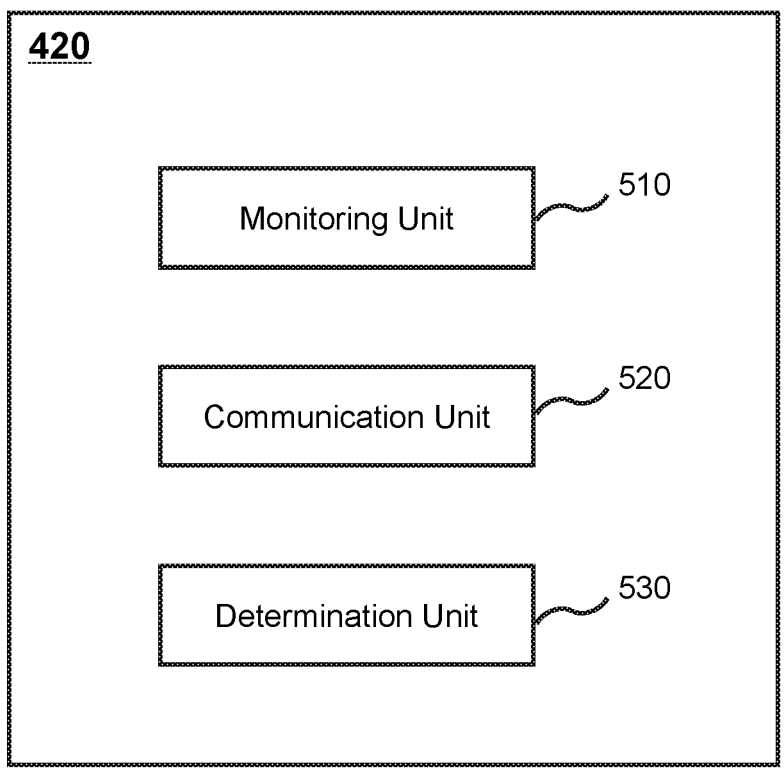
FIG. 5 is a block diagram illustrating an exemplary computing module according to some embodiments of the present disclosure.

FIG. 5 is a block diagram illustrating an exemplary computing module 420 according to some embodiments of the present disclosure. As shown in FIG. 5, the computing module 420 may include a monitoring unit 510, a communication unit 520, and a determination unit 530. One or more units in the computing module 420 may be implemented by and executed by at least one computing device and/or at least one mobile device, such as the CPU 220 in the computing device 200 as shown in FIG. 2, the CPU 340 in the mobile device 300 as shown in FIG. 3, or any component in the autonomous driving system 100. Each unit of the computing module 420 may be a hardware circuit that is designed to perform the following actions, a set of instructions stored in one or more storage media, and/or any combination of the hardware circuit and the one or more storage media.

The monitoring unit 510 may be configured to detect a sensor signal from the sensing module 440. The sensing module 440 may transmit the sensor signal to the computing module 420 via the vehicle network 410 and/or the gateway module 430. In some embodiments, the sensor signal may include a trigger signal, a status signal, an emergency signal, etc.

The trigger signal may include one or more electrical signals for switching a vehicle from a current driving mode to a target driving mode. In some embodiments, the current driving mode may be an autonomous driving mode and the target driving mode may be a manual driving mode. In some embodiments, the current driving mode may be the manual driving mode and the target driving mode may be the autonomous driving mode.

In some embodiments, the trigger signal may include one or more electronic signals associated with a control action of a steering system (e.g., a steering wheel) of the vehicle, a throttle of the vehicle, a brake pedal of the vehicle, a button of the vehicle, a user interface of the vehicle, etc. For example, the trigger signal may be associated with a rotation force of the steering wheel of the vehicle, such as electronic signals from a sensor to measuring the rotation force. As another example, the trigger signal may be associated with an input of a user interface of the vehicle, such as electronic signals from a sensor measuring the input of the user interface. The user interface of the vehicle may include any human-computer interaction interface, such as a touch-screen, a keyboard, a mouse, a trackball, a joystick, a stylus, an audio recognition device or application, a facial recognition device or application, etc.

The status signal may include one or more electrical signals associated with a status of the vehicle. For example, the status signal may include signals indicating remained power (e.g., remainder power of a battery), a remained volume of gasoline, a current location of the vehicle, a current speed of the vehicle, a current state of the throttle, a current state of the brake pedal, a current rotation angle of the steering wheel, a current road condition, a weather condition, etc. The weather condition may include a current weather condition, a future weather condition, etc.

In some embodiments, the status of the vehicle may include a recommended mode of autonomous driving, a recommended mode of manual driving, a recommended mode of semi-manual driving and semi-autonomous driving, a recommended mode of current driving mode, or the like, or any combination thereof.

The emergency signal may include an electrical signal indicating occurrence of an emergency to the vehicle. The emergency may include an error of a vehicle component, a deterioration of a road condition, a harsh environment, etc. Under a current driving mode, the monitoring unit 510 may detect occurrence of the emergency. For example, under the autonomous driving mode, the monitoring unit 510 may detect that the GPS of the vehicle does not work (e.g., loss of navigation signals). As another example, under the autonomous driving mode, the monitoring unit 510 may detect that the road the vehicle is driving on is narrow and there are many pedestrians 160 on the road.

In some embodiments, the communication unit 520 may be configured to receive the sensor signal from the monitoring unit 510.

In some embodiments, the communication unit 520 may be configured to send at least one switching signal to the gateway module 430 to switch the vehicle from the current driving mode to the target driving mode. For example, the at least one switching signal may be configured to switch the vehicle from the autonomous driving mode to the manual driving mode, or switch the vehicle from the manual driving mode to the autonomous driving mode.

In some embodiments, the communication unit 520 may be configured to communicate with a driver of the vehicle. For example, the communication unit 520 may transmit a notification associated with whether to switch driving mode to the driver of the vehicle based on the trigger signal and the status of the vehicle. As another example, the communication unit 520 may receive a switch confirmation from the driver in response to the notification, confirming the switching of the vehicle from the current driving mode to the target driving mode. As another example, the communication unit 520 may transmit an emergency notification reporting an emergency to the driver of the vehicle. The emergency notification may include information of the emergency, whether to switch the vehicle from the current driving mode to a target driving mode, etc. As another example, the communication unit 520 may receive an emergency switch confirmation that switches the vehicle from an autonomous driving mode to a manual driving mode in response to the emergency notification from the driver. In some embodiments, the notification, the switch confirmation, the emergency notification, and/or the emergency switch confirmation may be in a form of one or more electrical signals. In some embodiments, the notification, the switch confirmation, the emergency notification, and/or the emergency switch confirmation may include a form of a text form, an image form, an audio form, a video form, or the like, or any combination thereof.

The determination unit 530 may be configured to determine and/or generate the at least one switching signal to switch the vehicle from the current driving mode to the target driving mode. In some embodiments, the determination unit 530 may generate the at least one switching signal when the trigger signal meets a predetermined condition. The predetermined condition may include information of a predetermined machine learned reference behavior, a threshold corresponding to the driving behavior under the manual driving mode, stepping on a brake pedal from the driver, a click on a user interface of the vehicle, etc. In some embodiments, the determination unit 530 may generate the at least one switching signal when the communication unit 520 receives the switch confirmation from the driver confirming the switching of the vehicle from the current driving mode to the target driving mode. In some embodiments, the determination unit 530 may generate the at least one switching signal only when the status of the vehicle meets a predetermined status. The predetermined status may include a predetermined remained power, a predetermined remained volume of gasoline, a predetermined current location of the vehicle, a predetermined current speed of the vehicle, a predetermined current road condition, a predetermined current weather condition, or the like, or any combination thereof. For example, the communication unit 520 may first receive a trigger signal for switching the vehicle from an autonomous driving mode to a manual driving mode. The communication unit 520 may then receive status signals from the at least one sensor indicating that the current road condition is suitable for autonomous driving, the remained power is higher than the predetermined remained power, and the remained volume of gasoline is higher than the predetermined remained volume of gasoline. Even if the communication unit 520 receives a switch confirmation from the driver to switch the vehicle from the autonomous driving mode to the manual driving mode, the determination unit 530 may not generate at least one switching signal.

The determination unit 530 may also be configured to determine emergency switch signals that switch the vehicle from the autonomous driving mode to the manual driving mode based when the communication unit 520 receives the emergency switch confirmation from the driver of the vehicle.

Figure 6:
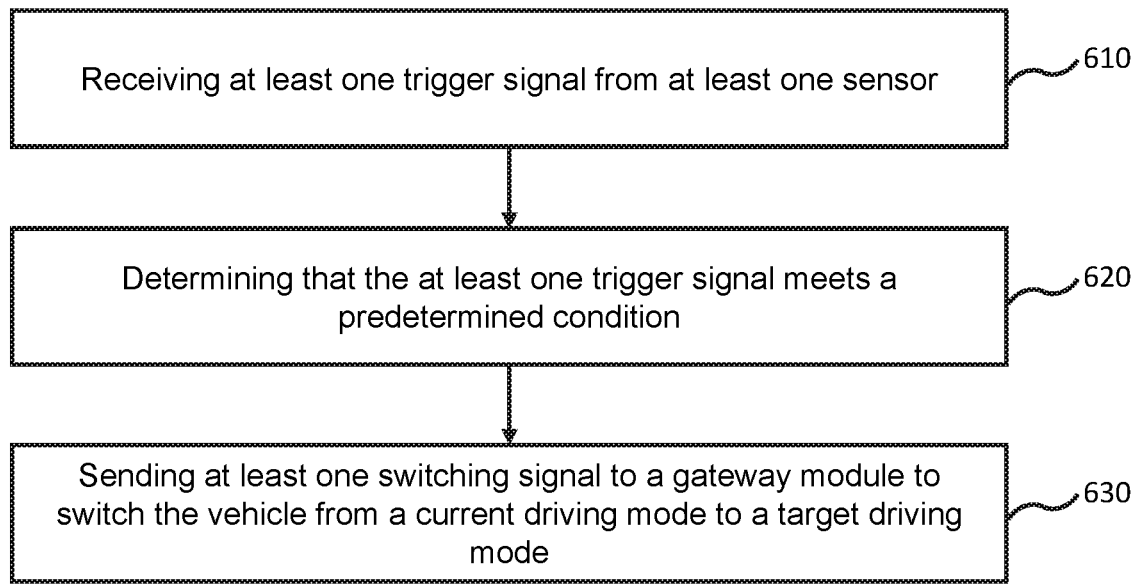
FIG. 6 is a flowchart illustrating an exemplary process for switching a driving mode of a vehicle according to some embodiments of the present disclosure.

FIG. 6 is a flowchart illustrating an exemplary process 600 for switching a driving mode of a vehicle according to some embodiments of the present disclosure. One or more steps in the process 600 may be implemented by an electronic device in the vehicle 110, such as the CPU 220 in the computing device 200, the processing circuit 224 and/or the interface circuit 222 in the CPU 220 in the vehicle 110, the CPU 340 in the mobile device 300 in the vehicle 110, and/or the computing module 420 in the vehicle 110. In some embodiments, the process 600 may be stored as a set of instructions in a non-transitory computer readable medium embodying a computer program product. The non-transitory computer readable medium may communicate with a computer device. When the instructions associated with the process 600 is executed, the computing device may receive at least one trigger signal from at least one sensor for switching a vehicle from a current driving mode to a target driving mode, determine that the at least trigger signal meets a predetermined condition, and send at least one switching signal to a gateway module to switch the vehicle from the current driving mode to the target driving mode.

In step 610, the communication unit 520 (and/or the CPU 220, the CPU 340, and/or the interface circuit 222) may receive at least one trigger signal from at least one sensor.

In some embodiments, the at least one trigger signal may be electronic signals associated with a control action of a steering system (e.g., a steering wheel) of the vehicle, a throttle of the vehicle, a brake pedal of the vehicle, a button of the vehicle, a user interface of the vehicle, etc. For example, the at least one trigger signal may be associated with a rotation force of the steering wheel of the vehicle, such as electronic signals from a sensor to measuring the rotation force. As another example, the at least one trigger signal may be associated with an input of a user interface of the vehicle, such as electronic signals from a sensor measuring the input of the user interface. The user interface of the vehicle may include any human-computer interaction interface, such as a touchscreen, a keyboard, a mouse, a trackball, a joystick, a stylus, an audio recognition device or application, a facial recognition device or application, etc.

In some embodiments, the sensor may be connected to, but is not limited to, a driving system of the vehicle. The driving system may include an engine management system (EMS), an electric power steering (EPS) system, an electric stability control (ESC) system, a steering column module (SCM), a door control unit (DCU), a speed control unit (SCU), a brake control unit, an electric control wiper (ECW), an electronic steering column lock (ESCL), a front area module (FAM), a driver door module (DDM), a smart key (SMK), a power seat module (PSM), or the like, or any combination thereof.

In some embodiments, the sensor may include, but is not limited to, a force sensor (e.g., a stress gauge), a touch sensor, a microphone, a speaker, a global positioning system (GPS), an inertial measurement unit (IMU), a camera, a light detection and ranging (LIDAR), a radio detection and ranging (RADAR), an ultrasonic sensor, an environmental sensor, a gasoline level sensor, or the like, or any combination thereof. The touch sensor may be configured to sense a driver's touch on the vehicle. For example, the touch sensor may include a touch sensor on the steering wheel of the vehicle, a press sensor on the throttle of the vehicle, a press sensor on the brake pedal of the vehicle, a finger touch sensor on a touchscreen of the vehicle, etc. The microphone may be configured to receive audio (e.g., a voice command or other audio input) from the driver of the vehicle. The speaker may be configured to output audio to the driver of the vehicle. The GPS may be configured to determine a geographic location of the vehicle. For example, the GPS may communicate with the positioning system 140 and/or the network 120 to determine the geographic location of the vehicle. The IMU may be configured to sense position and orientation changes of the vehicle based on an inertial acceleration of the vehicle. Exemplary IMU may include one or more accelerometers, gyroscopes, etc. The camera may be configured to capture images of the environment in which the vehicle is located. For example, the camera may detect visible light, infrared light, ultraviolet light, or light of any other wavelength around the vehicle. As another example, the camera may detect road condition around the vehicle, such as traffic lights, road signs, the positions of other vehicles, pedestrians and/or obstacles on a road, etc. The camera may be any type of camera including, for example, a still camera, a video camera, etc. The LIDAR, the RADAR and the ultrasonic sensor may be configured to detect an object by electric wave. The object may include other vehicles, lane markings, curbs, etc. The LIDAR, the RADAR and the ultrasonic sensor may determine characteristics of the object (e.g., a range from the object to the vehicle, an altitude of the object, a direction of the object, a speed of the object, etc.) using different techniques. For example, the RADAR may use radio waves to determine a distance between the object and the vehicle. As another example, the LIDAR may use light beams to determine a distance between the object and the vehicle. As still another, the ultrasonic sensor may use sound propagation to determine a distance between the object and the vehicle. The environmental sensor may include one or more sensors configured to sense environment information. The environment information may include a status of the vehicle (e.g., remained power, a remained volume of gasoline, a current location of the vehicle, a current speed of the vehicle, a current road condition, or a current weather condition, etc.), a status of a driver of the vehicle (e.g., a heart rate of the driver, alcohol concentration of the driver, etc.), etc.

For example, the communication unit 520 may receive the at least one trigger signal for switching the vehicle from one driving mode to another driving mode. For example, the vehicle may include a touch sensor on the steering wheel. The driver of the vehicle may touch and/or rotate the steering wheel. The touch sensor on the steering wheel may generate electronic signals corresponding to the touch and/or rotation, and then transmit the signal to the communication unit 520. As another example, the driver of the vehicle may step on the throttle and/or the brake pedal. A sensor installed in the throttling system (e.g., on the throttle and/or the brake pedal) may generate electronic signals corresponding to the pressure on the throttle and/or the brake pedal and transmit the signals to the communication unit 520. As still another example, an emergency (e.g., an error of the vehicle component, deterioration of the road condition, etc.) may occur indicating that a current driving mode may be unsafe. The sensor that detects the emergency may generate an emergency signal(s) and transmit the emergency signal(s) to the communication unit 520.

The switching of driving mode may be automatically or with the driver's consent under certain conditions. In step 620, the determination unit 530 (and/or the CPU 220, the CPU 340, and/or the processing circuit 224) may determine that the at least one trigger signal meets a predetermined condition.

In some embodiments, the predetermined condition may include information of a predetermined reference behavior. For example, the predetermined reference behavior may include a predetermined machine learned reference behavior, a default reference behavior of the driving system of the vehicle, an empirical reference behavior of the driving system of the vehicle, a user-defined reference behavior, or the like, or any combination thereof. The predetermined machine learned reference behavior may include a driving behavior under the manual driving mode and a driving behavior under the autonomous driving mode. The driving behavior under the manual driving mode may include the driver's behavior, such as a mode of a rotation force on the steering wheel, a strength of the rotation force on the steering wheel, a strength of stepping on the throttle, a speed of stepping on the throttle, a driving behavior under emergencies, etc.

In some embodiments, the predetermined condition may include a threshold corresponding to the driving behavior under the manual driving mode. For example, the threshold may be a first threshold of the strength of rotation force on the steering wheel. Under the autonomous driving mode, when the driver rotates the steering wheel, the determination unit 530 may determine whether the strength of the rotation force from the driver is larger than the first threshold. As another example, the threshold may be a second threshold of the strength of stepping on the throttle. Under the autonomous driving mode, when the driver steps on the throttle, the determination unit 530 may determine whether the strength of stepping on the throttle is larger than the second threshold.

In some embodiments, the predetermined condition may include stepping on the brake pedal from the driver, a click on the user interface of the vehicle, etc. For example, under the autonomous driving mode, when the driver steps on the brake pedal, the determination unit 530 may determine the switch of the vehicle from the autonomous driving mode to the manual driving mode. As another example, under the manual driving mode, when the driver selects the autonomous driving mode (e.g., through a graphical user interface such as a touchscreen display on the vehicle), the determination unit 530 may determine the switch of the vehicle from the manual driving mode to the autonomous driving mode.

In step 630, the communication unit 520 (and/or the CPU 220, the CPU 340, and/or the interface circuit 222) may send at least one switching signal to the gateway module 430 to switch the vehicle from a current driving mode to a target driving mode. The computing module 420 may generate the at least one switching signal when the at least one trigger signal meets the predetermined condition in step 620.

In some embodiments, the current driving mode may include an autonomous driving mode and the target driving mode may include a manual driving mode. Under the manual driving mode, the driver may take a high degree control of the vehicle. For example, the driver may control the steering wheel, the throttle, the brake pedal, etc. Under the autonomous driving mode, the vehicle is at least partially capable of sensing its environment and navigating without human input. For example, under the autonomous driving mode, the vehicle may lock one or more of the steering wheel, the throttle and the brake pedal, and the vehicle may independently or substantially independently determine its own navigation strategy (e.g., conducting mapping & route planning) and execute the navigation strategy without the driver's input. The driver's input may include the driver's control of the steering wheel, the throttle, the brake pedal, etc.

In some embodiments, the current driving mode may include the manual driving mode and the target driving mode may include the autonomous driving mode. The communication unit 520 may receive the at least one trigger signal for switching the vehicle from the manual driving mode to the autonomous driving mode. For example, under the manual driving mode, a sensor of the vehicle (e.g., the GPS, the LIDAR, the RADAR, the ultrasonic sensor, etc.) may detect environment information (traffic and/or road condition) of the vehicle, and the determination unit 530 may determine that there are less vehicles and no traffic accidents on the road where the vehicle is driving. Accordingly, the determination unit 530 may inform the driver that the road condition is suitable for the autonomous driving mode. In some embodiments, the computing module 420 may take over the control of the vehicle, and switch the vehicle from the current manual driving mode to the autonomous driving mode.

The at least one switching signal may be configured to switch the vehicle from one driving mode to another driving mode. For example, the at least one switching signal may be configured to switch the vehicle from the autonomous driving mode to the manual driving mode, or switch the vehicle from the manual driving mode to the autonomous driving mode. The gateway module 430 may serve as a gateway of communications between the vehicle components. For example, the gateway module may be configured to enable communication between the computing module 420 and other hardware controlling units (e.g., the sensing module 440, the body 450, the driving module 460, the control module 470, the safety module 480, and/or the storage module 490), and/or between vehicle components (e.g., the driving system) over the vehicle network 410. The vehicle network 410 may include one or more controller area networks (CANs), one or more local interconnect networks (LINs), an Ethernet network, a FlexRay™ network, a media oriented systems transport (MOST) network, etc. In some embodiments, the gateway module 430 may receive the at least one switching signal from the communication unit 520. The gateway module 430 may then transmit the at least one switching signal to one or more driving systems of the vehicle via the vehicle network 410.

The driving systems may control the vehicle based on the switching signal. For example, under the autonomous driving mode, when the sensor on the steering wheel detects a touch from the driver, and/or when the strength of the rotation force on the steering wheel from the driver is larger than the first threshold, the communication unit 520 may send the at least one switching signal to the gateway module to switch the vehicle from the autonomous driving mode to the manual driving mode. The gateway module 430 may send the at least one switching signal to the EPS system. The EPS system may process the at least one switching signal and control the steering wheel under the manual driving mode. For example, under the manual driving mode, when the driver holds and rotates the steering wheel, the EPS system may send a command to an electric motor of the vehicle. The command may instruct the electric motor to generate auxiliary power to control the steering wheel.

Figure 7:
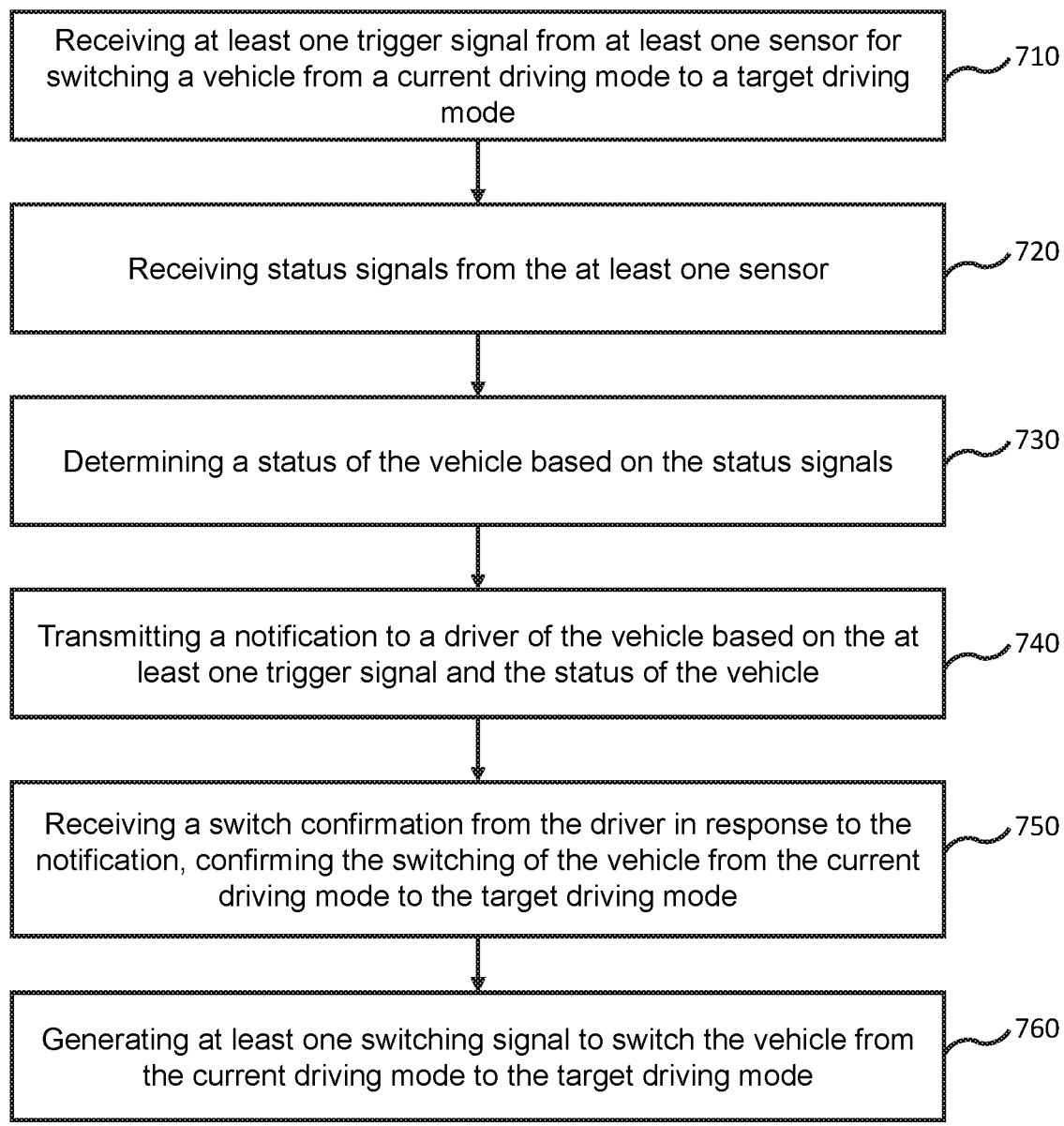
FIG. 7 is a flowchart illustrating an exemplary process for switching a driving mode of a vehicle according to some embodiments of the present disclosure.

FIG. 7 is a flowchart illustrating an exemplary process 700 for switching a driving mode of a vehicle according to some embodiments of the present disclosure. One or more steps in the process 700 may be implemented by an electronic device in the vehicle 110, such as the CPU 220 in the computing device 200 in the vehicle 110, the processing circuit 224 and/or the interface circuit 222 in the CPU 220 in the vehicle 110, the CPU 340 in the mobile device 300 in the vehicle 110, and/or the computing module 420 in the vehicle 110. In some embodiments, the process 700 may be stored as a set of instructions in a non-transitory computer readable medium embodying a computer program product. The non-transitory computer readable medium may communicate with a computer device. When the instructions associated with the process 700 is executed, the computing device may receive at least one trigger signal from at least one sensor for switching a vehicle from a current driving mode to a target driving mode, receive status signals from the at least one sensor, determine the status of the vehicle base on the status signals, transmit a notification to a driver of the vehicle based on the at least one trigger signal and the status of the vehicle, receive a switch confirmation from the driver in response to the notification confirming the switching of the vehicle from the current driving mode to the target driving mode, and generate at least one switching signal to switch the vehicle from the current driving mode to the target driving mode.

In step 710, the communication unit 520 (and/or the CPU 220, the CPU 340, and/or the interface circuit 222) may receive at least one trigger signal from at least one sensor for switching a vehicle from a current driving mode to a target driving mode. In some embodiments, the current driving mode may include an autonomous driving mode and the target driving mode may include a manual driving mode. In some embodiments, the current driving mode may include the manual driving mode and the target driving mode may include the autonomous driving mode. In some embodiments, step 710 may be similar to step 610 in FIG. 6.

In step 720, the communication unit 520 (and/or the CPU 220, the CPU 340, and/or the interface circuit 222) may receive status signals from the at least one sensor. The status signals may be one or more electrical signals associated with a status of the vehicle.

In some embodiments, the status signals may include signals indicating remained power (e.g., remainder power of a battery), a remained volume of gasoline, a current location of the vehicle, a current speed of the vehicle, a current state of the throttle, a current state of the brake pedal, a current rotation angle of the steering wheel, a current road condition, a weather condition, etc. The weather condition may include a current weather condition, a future weather condition, etc. For example, an environmental sensor or sensing system of the vehicle may detect the current weather condition and generate a weather signal corresponding to the current weather condition. The communication unit 520 may receive the weather signal from the environmental sensor via the vehicle network 410. The communication unit 520 may also receive data associated with the weather condition from the network 120, the server 130, and/or the storage module 490. As another example, a gasoline level sensor may detect the remained volume of gasoline and generate a gasoline indicating signal indicating the level of the remained volume of gasoline (e.g., a high-level remained volume of gasoline, a low-level remained volume of gasoline, etc.). The communication unit 520 may receive the gasoline indicating signal from the gasoline level sensor via the vehicle network 410. As still another example, a road condition sensor (e.g., a LIDAR, a RADAR, an ultrasonic sensor, etc.) of the vehicle may detect the current road condition around the vehicle (e.g., traffic lights, road signs, the positions of other vehicles, road width, pedestrians and/or obstacles on a road, etc.) and generate a road condition signal. The communication unit 520 may receive the road condition signal from the road condition sensor via the vehicle network 410.

In step 730, the determination unit 530 (and/or the CPU 220, the CPU 340, and/or the processing circuit 224) may determine the status of the vehicle base on the status signals. In some embodiments, the determination unit 530 may collect a plurality of status signals. One or more status signals may be associated with a status of the vehicle. The status of the vehicle may include a recommended mode of autonomous driving, a recommended mode of manual driving, a recommended mode of semi-manual driving and semi-autonomous driving, a recommended mode of current driving mode, or the like, or any combination thereof.

For example, the determination unit 530 may determine the status of the vehicle based on the weather signal (e.g., a signal(s) of heavy rain, a heavy snow, a fine weather, etc.). The determine unit 530 may determine a recommended mode of manual driving of the vehicle based on the weather signal indicating a heavy snow outside the vehicle. As another example, the determination unit 530 may determine the status of the vehicle based on the gasoline indicating signal (e.g., a high-level remained volume of gasoline, a low-level remained volume of gasoline, etc.). The determination unit 530 may determine a recommended mode of autonomous driving based on the gasoline indicating signal indicating a low-level remained volume of gasoline. As still another example, the determination unit 530 may determine the status of the vehicle based on the road condition signal (e.g., traffic lights, road signs, the positions of other vehicles, road width, pedestrians and/or obstacles on a road, etc.). The determination unit 530 may determine a recommended mode of manual driving of the vehicle based on the road condition signal indicating a bad traffic.

In step 740, the communication unit 520 (and/or the CPU 220, the CPU 340, and/or the interface circuit 222) may transmit a notification associated with whether to switch driving mode to a driver of the vehicle based on the at least one trigger signal and the status of the vehicle. In some embodiments, the determination unit 530 may generate the notification based on the at least one trigger signal and the status of the vehicle. The notification may include information of the switching of the vehicle from the current driving mode to the target driving mode. The notification may include textual notification, image notification, audio notification, video notification, or the like, or any combination thereof. In some embodiments, the determination unit 530 may generate the notification in a form of one or more electrical signals. In some embodiments, the communication unit 520 may transmit the notification to the driver of the vehicle via a user interface of the vehicle (e.g., a touchscreen, an audio output device, etc.).

Under the current driving mode, the determination unit 530 may determine whether the at least one trigger signal for switching the vehicle from the autonomous driving mode to the manual driving mode meets a predetermined condition. In some embodiments, the predetermined condition may include information of a predetermined machine learned reference behavior. The predetermined machine learned reference behavior may include a driving behavior under the manual driving mode and a driving behavior under the autonomous driving mode. The driving behavior under the manual driving mode may include the driver's behavior, such as a mode of a rotation force on the steering wheel, a strength of the rotation force on the steering wheel, a strength of stepping on the throttle, a speed of stepping on the throttle, a driving behavior under emergencies, etc. In some embodiments, the predetermined condition may include a threshold corresponding to the driving behavior under the manual driving mode. In some embodiments, the predetermined condition may include stepping on the brake pedal from the driver, a click on the user interface of the vehicle, etc. Detailed description of the predetermined condition has been described in FIG. 6 and the description thereof. The determination unit 530 may also determine whether the switch from the current driving mode to the target driving mode is suitable based on the status of the vehicle. The determination unit 530 may then generate the notification indicating whether the switch from the current driving mode to the target driving mode is suitable and whether to switch the vehicle from the current driving mode to the target driving mode. The communication unit 520 may transmit the notification to the driver of the vehicle.

For example, under the autonomous driving mode, the communication unit 520 receives a strength of rotation force on the steering wheel from the driver. The determination unit 530 may first determine that the strength is larger than a first threshold of the strength of rotation force on the steering wheel. In some embodiments, the determination unit 530 may also determine that the driver touches and/or holds the sensor on the steering wheel. If this or these conditions are satisfied, the determination unit 530 may next determine that the road the vehicle is driving on is good (e.g., no traffic accidence, a smooth road, etc.). The determination unit 530 may generate the notification indicating that the autonomous driving mode is better and transmit the notification of whether to switch the vehicle from the autonomous driving mode to the manual driving mode to the driver.

As another example, under the autonomous driving mode, the communication unit 520 may receive the at least one trigger signal via the user interface of the vehicle (e.g., a touchscreen, a mouse, a keyboard, an audio recognition device, etc.) for switching the vehicle from the autonomous driving mode to the manual driving mode. The at least one trigger signal may be electrical signals associated with a click on the touchscreen of the vehicle, a click on the mouse of the vehicle, a press on the keyboard of the vehicle, a voice command via the audio recognition device or application (e.g., a microphone), etc. The determination unit 530 may determine whether the switch from the autonomous driving mode to the manual driving mode is suitable based on the status of the vehicle (e.g., the road condition, the weather condition, etc.). For example, the determination unit 530 may determine that the remained volume of gasoline of the vehicle is not sufficient for navigating to the nearest gas station under manual driving mode, but sufficient for navigating to the nearest gas station under the autonomous driving mode (e.g., because the determination unit 530 may real-time determine the most efficient driving speed and route planning based on the road, traffic, and whether conditions.). The determination unit 530 may determine that the vehicle is fuel-efficient under the autonomous driving mode. The determination unit 530 may generate the notification indicating that the autonomous driving mode is better and transmit the notification of whether to switch the vehicle from the autonomous driving mode to the manual driving mode to the driver.

As still another example, under the manual driving mode, the communication unit 520 may receive the at least one trigger signal via the user interface of the vehicle (e.g., a touchscreen, a mouse, a keyboard, an audio recognition device, or a switch operable by the user, etc.) for switching the vehicle from the manual driving mode to the autonomous driving mode. The at least one trigger signal may be one or more electrical signals associated with a click on the touchscreen of the vehicle, a click on the mouse of the vehicle, a press on the keyboard of the vehicle, a voice command via the audio recognition device or application (e.g., a microphone), etc. The determination unit 530 may determine whether the switch from the autonomous driving mode to the manual driving mode is suitable based on the status of the vehicle (e.g., the road condition, the weather condition, etc.). For example, the determination unit 530 may determine that the road the vehicle driving on is narrow and the manual driving mode may be safe. The determination unit 530 may generate the notification indicating that the manual driving mode is better and transmit the notification of whether to switch the vehicle from the manual driving mode to the autonomous driving mode to the driver.

In step 750, the communication unit 520 (and/or the CPU 220, the CPU 340, and/or the interface circuit 222) may receive a switch confirmation from the driver in response to the notification, confirming the switching of the vehicle from the current driving mode to the target driving mode. The switch confirmation may include textual confirmation, image confirmation, audio confirmation, video confirmation, or the like, or any combination thereof. The driver may transmit the switch confirmation to the communication unit 520 via the user interface of the vehicle (e.g., a touchscreen, a keyboard, a mouse, a speaker, a microphone, or a switch operable by the user, etc.). For example, the touchscreen of the vehicle may display the notification. The communication unit 520 may receive the switch confirmation in a form of one or more electrical signals. The notification may include a first select tab to switch the vehicle from the current driving mode to the target driving mode, a second select tab not to switch the vehicle from the current driving mode to the target driving mode, etc. The driver may click on the first tab to confirm the switching of the vehicle from the current driving mode to the target driving mode. As another example, a speaker of the vehicle may output the notification in the form of audio. The notification may include audio prompting the driver to switch or not switch the vehicle from the current driving mode to the target driving mode. The driver may input a voice command via the microphone of the vehicle. The voice command may confirm the switching of the vehicle from the current driving mode to the target driving mode.

In step 760, the determination unit 530 (and/or the CPU 220, the CPU 340, and/or the processing circuit 224) may generate at least one switching signal to switch the vehicle from the current driving mode to the target driving mode. The at least one switching signal may be configured to switch the vehicle from the autonomous driving mode to the manual driving mode, or switch the vehicle from the manual driving mode to the autonomous driving mode.

In some embodiments, the determination unit 530 may generate the at least one switching signal when the communication unit 520 receives the switch confirmation from the driver confirming the switching of the vehicle from the current driving mode to the target driving mode in step 750.

In some embodiments, the switch confirmation from the driver in step 750 may indicate that the driver selects to keep the current driving mode and not to switch the driving mode of the vehicle. The determination unit 530 may not generate the at least one switching signal to switch the vehicle from the current driving mode to the target driving mode. For example, under the autonomous driving mode, the communication unit 520 may receive the at least one trigger signal for switching the vehicle from the autonomous driving mode to the manual driving mode. The determination unit 530 may determine that the status of the vehicle (e.g., the road condition, the weather condition, etc.) is suitable for the autonomous driving mode. The communication unit 520 may transmit the notification to the driver suggesting that the autonomous driving mode is better. The driver may follow the suggestion and transmit the switch confirmation of keeping the autonomous driving mode to the communication unit 520. The determination unit 530 may not generate the at least one switching signal to switch the vehicle from the autonomous driving mode to the manual driving mode.

In some embodiments, the determination unit 530 may generate the at least one switching signal only when the status of the vehicle meets a predetermined status. The predetermined status may include a predetermined remained power, a predetermined remained volume of gasoline, a predetermined current location of the vehicle, a predetermined current speed of the vehicle, a predetermined current road condition, a predetermined current weather condition, or the like, or any combination thereof. For example, the communication unit 520 may first receive at least one trigger signal for switching the vehicle from an autonomous driving mode to a manual driving mode. The communication unit 520 may then receive status signals from the at least one sensor indicating that the current road condition is suitable for autonomous driving, the remained power is higher than the predetermined remained power, and the remained volume of gasoline is higher than the predetermined remained volume of gasoline. Even if the communication unit 520 receives a switch confirmation from the driver to switch the vehicle from the autonomous driving mode to the manual driving mode, the determination unit 530 may not generate at least one switching signal.

The above description is merely for illustrative purposes. It should be noted that those skilled in the art may contemplate additional or alternative steps besides the steps described in FIG. 7. In some embodiments, step 750 and step 760 may be omitted. For example, under the autonomous driving mode, the determination unit 530 may determine that another vehicle in front of the vehicle is suddenly braking or slowing down. At the moment, if the communication unit 520 receives the at least one trigger signal for switching the vehicle from the autonomous driving mode to the manual driving mode, the determination unit 530 may determine that the switch is unsafe. The communication unit 520 may transmit the notification to the driver of the vehicle indicating that the switching may be unsafe and the vehicle may keep the autonomous driving mode. The communication unit 520 may not receive the switch confirmation from the driver. The determination unit 530 may not generate the at least one switching signal to switch the vehicle from the autonomous driving mode to the manual driving mode. The vehicle may automatically take emergency measures to avoid collision, such as slowing down, taking an emergency steering, etc. As another example, step 710 may be skipped. For example, under the manual driving mode, the communication unit 520 may receive real-time status signals from the at least one sensor. The determination unit 530 may determine whether the status of the vehicle is suitable for the autonomous driving mode. If the status of the vehicle is suitable for the autonomous driving mode, the determination unit 530 may generate the notification that suggests the driver to switch the vehicle from the manual driving mode to the autonomous driving mode. The communication unit 520 may transmit the notification to the driver. As still another example, under the manual driving mode, the determination unit 530 may determine whether the driver wants to enter the autonomous driving mode based on a driving behavior of the driver (e.g., a mode of a rotation force on the steering wheel, a strength of the rotation force on the steering wheel, a strength of stepping on the throttle, etc.). The driving behavior of the driver may be obtained from a predetermined machine learned reference behavior. The determination unit 530 may generate the notification indicating whether the driver wants to switch from the manual driving mode to the autonomous driving mode. The communication unit 520 may transmit the notification to the driver.

Figure 8:
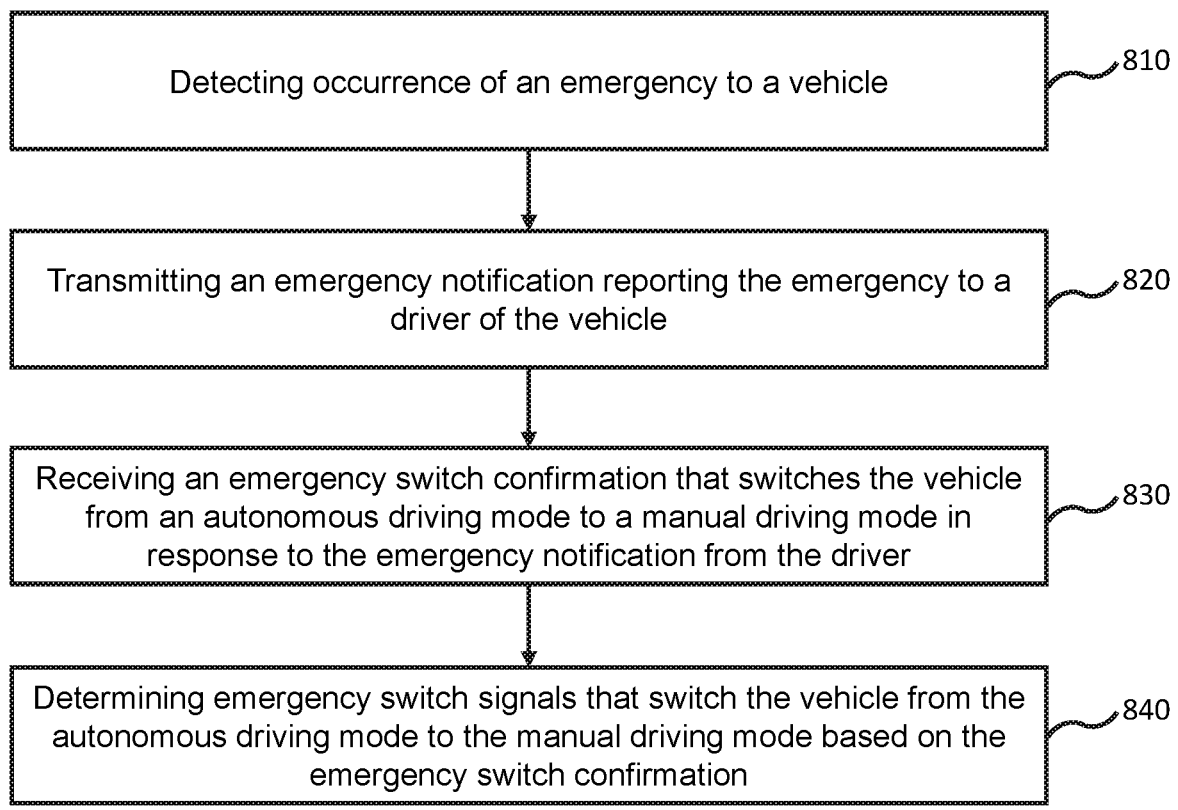
FIG. 8 is a flowchart illustrating an exemplary process for switching a driving mode of a vehicle according to some embodiments of the present disclosure.

FIG. 8 a flowchart illustrating an exemplary process 800 for switching a driving mode of a vehicle according to some embodiments of the present disclosure. One or more steps in the process 800 may be implemented by an electronic device in the vehicle 110, such as the CPU 220 in the computing device 200, the processing circuit 224 in the CPU 220, the CPU 340 in the mobile device 300, and/or the computing module 420 in the vehicle 110. In some embodiments, the process 800 may be stored as a set of instructions in a non-transitory computer readable medium embodying a computer program product. The non-transitory computer readable medium may communicate with a computer device. When the instructions associated with the process 800 is executed, the computing device may detect occurrence of an emergency to a vehicle, transmit an emergency notification reporting the emergency to a driver of a vehicle, receive an emergency switch confirmation that switches the vehicle from an autonomous driving mode to a manual driving mode in response to the emergency notification from the driver, and determine emergency switch signals that switch the vehicle from the autonomous driving mode to the manual driving mode based on the emergency switch confirmation.

In step 810, the monitoring unit 510 (and/or the CPU 220, the CPU 340, and/or the interface circuit 222) may detect occurrence of an emergency to a vehicle. In some embodiments, the sensing module 440 of the vehicle may detect the emergency. The sensing module 440 may generate a safety signal and transmit the safety signal to the computing module 420 via the vehicle network 410. The monitoring unit 510 may detect occurrence of the emergency based on the safety signal. The sensing module 440 may include at least one camera, at least one LIDAR, at least one RADAR, at least one ultrasonic sensor, at least one IMU, at least one GPS, etc. The emergency may include an error of a vehicle component, a deterioration of a road condition, a harsh environment, etc. In some embodiments, under a current driving mode, the monitoring unit 510 may detect occurrence of the emergency. For example, under the autonomous driving mode, the monitoring unit 510 may detect that the GPS of the vehicle does not work (e.g., loss of navigation signals). As another example, under the autonomous driving mode, the monitoring unit 510 may detect that the road the vehicle is driving on is narrow and there are many pedestrians 160 on the road.

In step 820, the communication unit 520 (and/or the CPU 220, the CPU 340, and/or the interface circuit 222) may transmit an emergency notification reporting the emergency to a driver of the vehicle. In some embodiments, the determination unit 530 may generate the emergency notification based on the emergency. The emergency notification may include information of the emergency, whether to switch the vehicle from the current driving mode to a target driving mode, etc. The emergency notification may include textual notification, image notification, audio notification, video notification, or the like, or any combination thereof. In some embodiments, the determination unit 530 may generate the emergency notification in a form of one or more electrical signals. In some embodiments, the communication unit 520 may transmit the emergency notification to the driver of the vehicle via a user interface of the vehicle (e.g., a touchscreen, an audio output device, etc.). For example, the touchscreen of the vehicle may display the emergency notification. As another example, a speaker of the vehicle may output the emergency notification to the driver in the form of audio.

In step 830, the communication unit 520 (and/or the CPU 220, the CPU 340, and/or the interface circuit 222) may receive an emergency switch confirmation that switches the vehicle from an autonomous driving mode to a manual driving mode in response to the emergency notification from the driver. In some embodiments, the vehicle may navigate under the autonomous driving mode, and the communication unit 520 may receive the emergency switch that switches the vehicle from the autonomous driving mode to the manual driving mode. The emergency switch confirmation may include textual confirmation, image confirmation, audio confirmation, video confirmation, or the like, or any combination thereof. In some embodiments, the communication unit 520 may receive the emergency switch confirmation in a form of one or more electrical signals. The driver may transmit the emergency switch confirmation to the communication unit 520 via the user interface of the vehicle (e.g., a touchscreen, a keyboard, a mouse, a microphone, etc.).

For example, under the autonomous driving mode, the touchscreen of the vehicle may display the emergency notification. The emergency notification may include information of the emergency (e.g., loss of navigation signals, a bad road condition, etc.), a first select tab to switch the vehicle from the autonomous driving mode to the manual driving mode, a second select tab not to switch the vehicle from the autonomous driving mode to the manual driving mode, etc. The driver may click on the first select tab to confirm the switch of the vehicle from the autonomous driving mode to the manual driving mode.

As still another example, under the autonomous driving mode, the speaker of the vehicle may output the emergency notification in the form of audio. The emergency notification may include audio of the emergency (e.g., loss of navigation signals, a bad road condition, etc.), prompting the driver to switch or not switch the vehicle from the autonomous driving mode to the manual driving mode. The driver of the vehicle may input a voice command to confirm the switch from the autonomous driving mode to the manual driving mode via the microphone of the vehicle.

In step 840, the determination unit 530 (and/or the CPU 220, the CPU 340, and/or the processing circuit 224) may determine emergency switch signals that switch the vehicle from the autonomous driving mode to the manual driving mode based on the emergency switch confirmation. The determination unit 530 may determine the emergency switch signals when the communication unit 520 receives the emergency switch confirmation that switches the vehicle from the autonomous driving mode to the manual driving mode in step 830.

The above description is merely for illustrative purposes. It should be noted that those skilled in the art may contemplate additional or alternative steps besides the steps described in FIG. 8. In some embodiments, step 830 may be omitted. For example, under the autonomous driving mode, the monitoring unit 510 may detect occurrence of the emergency. The communication unit 520 may transmit the emergency notification reporting the emergency to the driver of the vehicle. The communication unit 520 may not receive the emergency switch confirmation from the driver. Meanwhile, the determination unit 530 may determine emergency signals that control the vehicle to take emergency measures (e.g., an emergency stop).

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by the present disclosure, and are within the spirit and scope of the exemplary embodiments of the present disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device" or "system." Furthermore, aspects of the present disclosure may take the form of a computer program product embodied in one or more non-transitory computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter lie in less than all features of a single foregoing disclosed embodiment.

We claim:

1. An electronic system for switching a driving mode of a vehicle, comprising:
   at least one sensor configured to connect to a driving system of the vehicle;
   at least one gateway module connected to the at least one sensor through a controller area network; and
   processing circuits connected to the at least one gateway module, wherein during operation, the processing circuits are directed to:
   receive at least one trigger signal for switching the vehicle from a current driving mode to a target driving mode from the at least one sensor;
   receive status signals from the at least one sensor;
   determine a status of the vehicle based on the status signals;
   transmit a notification to a driver of the vehicle based on the at least one trigger signal and the status of the vehicle;
   receive a switch confirmation from the driver in response to the notification, confirming the switching of the vehicle from the current driving mode to the target driving mode; and
   generate at least one switching signal to switch the vehicle from the current driving mode to the target driving mode and send the at least one switching signal to the at least one gateway module except that when the current driving mode is an autonomous driving mode and the target driving mode is a manual driving mode, and when the status signals are received indicating that a current road condition is suitable for autonomous driving, and a remained power is higher than a predetermined remained power or a remained volume of gasoline is higher than a predetermined remained volume of gasoline.

2. The electronic system of claim 1, wherein the current driving mode includes the autonomous driving mode and the target driving mode includes the manual driving mode; or the current driving mode includes the manual driving mode and the target driving mode includes the autonomous driving mode, wherein under the autonomous driving mode the vehicle independently determines and executes a navigation strategy without the driver's input.

3. The electronic system of claim 1, wherein the at least one trigger signal is associated with a rotation force of a steering wheel of the vehicle, and
   the predetermined condition includes that the rotation force is larger than a first predetermined threshold.

4. The electronic system of claim 3, wherein the at least one sensor includes a touch sensor on the steering wheel of the vehicle to sense a touch on the steering wheel, and
   the at least one trigger signal includes at least one signal from the touch sensor.

5. The electronic system of claim 1, wherein the at least one trigger signal is associated with a sensor signal caused by a control action of at least one of a steering wheel of the vehicle, a throttle or a brake pedal of the vehicle; and
   the predetermined condition includes that the control action matches a predetermined machine learned reference behavior.

6. The electronic system of claim 1, wherein the switch confirmation includes at least one of a click on a user interface of the vehicle, a press on a button of the vehicle, or a voice command.

7. The electronic system of claim 1, wherein the status of the vehicle includes at least one of the remained power, the remained volume of gasoline, a current location of the vehicle, a current speed of the vehicle, the current road condition, or a current weather condition; and
   wherein the processing circuits generate the at least one switching signal only when the status of the vehicle meets a predetermined status.

8. The electronic system of claim 1, wherein the processing circuits are further directed to: detect occurrence of an emergency to the vehicle; transmit an emergency notification reporting the emergency to the driver of the vehicle; receive an emergency switch confirmation that switches the vehicle from the autonomous driving mode to the manual driving mode in response to the emergency notification from the driver; and determine emergency switch signals that switch the vehicle from the autonomous driving mode to the manual driving mode based on the emergency switch confirmation.

9. A method for switching a driving mode of a vehicle, implemented on an electronic system having at least one sensor configured to connect to a driving system of the vehicle, at least one gateway module connected to the at least one sensor through a controller area network, and processing circuits connected to the at least one gateway module, comprising:
   receiving at least one trigger signal for switching the vehicle from a current driving mode to a target driving mode from the at least one sensor;
   receive status signals from the at least one sensor;
   determine a status of the vehicle based on the status signals;
   transmit a notification to a driver of the vehicle based on the at least one trigger signal and the status of the vehicle;
   receive a switch confirmation from the driver in response to the notification, confirming the switching of the vehicle from the current driving mode to the target driving mode; and
   generate at least one switching signal to switch the vehicle from the current driving mode to the target driving mode and send the at least one switching signal to the at least one gateway module except that when the current driving mode is an autonomous driving mode and the target driving mode is a manual driving mode, and when the status signals are received indicating that a current road condition is suitable for autonomous driving, and a remained power is higher than a predetermined remained power or a remained volume of gasoline is higher than a predetermined remained volume of gasoline.

10. The method of claim 9, wherein the current driving mode includes the autonomous driving mode and the target driving mode includes the manual driving mode; or the current driving mode includes the manual driving mode and the target driving mode includes the autonomous driving mode, wherein under the autonomous driving mode the vehicle independently determines and executes a navigation strategy without the driver's input.

11. The method of claim 9, wherein the at least one trigger signal is associated with a rotation force of a steering wheel of the vehicle, and the predetermined condition includes that the rotation force is larger than a first predetermined threshold.

12. The method of claim 11, wherein the at least one sensor includes a touch sensor on the steering wheel of the vehicle to sense a touch on the steering wheel, and
   the at least one trigger signal includes at least one signal from the touch sensor.

13. The method of claim 9, wherein the at least one trigger signal is associated with a sensor signal caused by a control action of at least one of a steering wheel of the vehicle, a throttle or a brake pedal of the vehicle; and
   the predetermined condition includes that the control action matches a predetermined machine learned reference behavior.

14. The method of 9, wherein the switch confirmation includes at least one of a click on a user interface of the vehicle, a press on a button of the vehicle, or a voice command.

15. The method of claim 9, wherein the status of the vehicle includes at least one of the remained power, the remained volume of gasoline, a current location of the vehicle, a current speed of the vehicle, the current road condition, or a current weather condition; and
   wherein the processing circuits generate the at least one switching signal only when the status of the vehicle meets a predetermined status.

16. The method of claim 9, further comprising: detecting occurrence of an emergency to the vehicle; transmitting an emergency notification reporting the emergency to the driver of the vehicle; receiving an emergency switch confirmation that switches the vehicle from the autonomous driving mode to the manual driving mode in response to the emergency notification from the driver; and determining emergency switch signals that switch the vehicle from the autonomous driving mode to the manual driving mode based on the emergency switch confirmation.

17. A non-transitory computer readable medium comprising instructions for switching a driving mode of a vehicle, wherein during operation, the instructions are configured to cause an electronic system to:
   receive at least one trigger signal for switching the vehicle from a current driving mode to a target driving mode from the at least one sensor;
   receive status signals from the at least one sensor;
   determine a status of the vehicle based on the status signals;
   transmit a notification to a driver of the vehicle based on the at least one trigger signal and the status of the vehicle;
   receive a switch confirmation from the driver in response to the notification, confirming the switching of the vehicle from the current driving mode to the target driving mode; and
   generate at least one switching signal to switch the vehicle from the current driving mode to the target driving mode and send the at least one switching signal to the at least one gateway module except that when the current driving mode is an autonomous driving mode and the target driving mode is a manual driving mode, and when the status signals are received indicating that a current road condition is suitable for autonomous driving, and a remained power is higher than a predetermined remained power or a remained volume of gasoline is higher than a predetermined remained volume of gasoline.

18. The non-transitory computer readable medium of claim 17, wherein the current driving mode includes an autonomous driving mode and the target driving mode includes a manual driving mode; or
   the current driving mode includes the manual driving mode and the target driving mode includes the autonomous driving mode,
   wherein under the autonomous driving mode the vehicle independently determines and executes a navigation strategy without a driver's input.

* * * * *